United States Patent
Sarrafzadeh et al.

(10) Patent No.: US 11,763,075 B1
(45) Date of Patent: Sep. 19, 2023

(54) METHOD AND SYSTEM OF DISCOVERING TEMPLATES FOR DOCUMENTS

(71) Applicant: Microsoft Technology Licensing, LLC, Redmond, WA (US)

(72) Inventors: Bahareh Sarrafzadeh, Seattle, WA (US); Sujay Kumar Jauhar, Kirkland, WA (US); Casey Jo Gossard, Spokane, WA (US); Maria Leonor Pacheco Gonzalez, West Lafayette, IN (US); Curtis Dean Anderson, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/827,213

(22) Filed: May 27, 2022

(51) Int. Cl.
*G06N 3/08* (2023.01)
*G06F 40/186* (2020.01)
*G06F 40/12* (2020.01)

(52) U.S. Cl.
CPC ............ *G06F 40/186* (2020.01); *G06F 40/12* (2020.01)

(58) Field of Classification Search
CPC .............................. G06F 40/186; G06F 40/12
See application file for complete search history.

(56) References Cited

U.S. PATENT DOCUMENTS

| | | |
|---|---|---|
| 6,085,201 A | 7/2000 | Tso |
| 8,959,109 B2 | 2/2015 | Sgro et al. |
| 10,579,725 B2 | 3/2020 | De Mello Brandao et al. |
| 11,003,848 B2 | 5/2021 | De Beus |
| 11,568,863 B1 * | 1/2023 | Sarikaya ................. G10L 15/02 |
| 2007/0079236 A1 | 4/2007 | Schrier et al. |
| 2011/0136542 A1 | 6/2011 | Sathish et al. |

(Continued)

FOREIGN PATENT DOCUMENTS

| | | |
|---|---|---|
| CN | 113378539 A | 9/2021 |
| KR | 20210086849 A | 7/2021 |

(Continued)

OTHER PUBLICATIONS

"Bewitchment Wiki", Retrieved from: https://bewitchment.fandom.com/wiki/Help/Making_Templates, Retrieved date: Apr. 6, 2022, 5 Pages.

(Continued)

*Primary Examiner* — Hassan Mrabi
(74) *Attorney, Agent, or Firm* — NovoTechIP International PLLC

(57) ABSTRACT

A system and method and for identifying a template for a document includes receiving a request to identify the template from among a plurality of available templates, the plurality of templates being templates that are available for use in an application. After receiving the request, the content and structure of the document are encoded into one or more embedding representations via a trained document encoder and the embedding representations are compared to a plurality of template representations, each of the plurality of template representations being a representation of content and structure of one of the plurality of templates to identify one of the plurality of templates as corresponding to the document. The identified template is then provided for display as a recommended template.

20 Claims, 10 Drawing Sheets

(56) References Cited

U.S. PATENT DOCUMENTS

| | | | | |
|---|---|---|---|---|
| 2012/0069051 | A1* | 3/2012 | Hagbi | G06T 19/006 345/633 |
| 2014/0013212 | A1 | 1/2014 | Von Haden et al. | |
| 2020/0143137 | A1* | 5/2020 | Gottemukkula | G06N 3/04 |
| 2020/0342167 | A1 | 10/2020 | Sivaji et al. | |
| 2022/0083523 | A1 | 3/2022 | Ben-aharon et al. | |

FOREIGN PATENT DOCUMENTS

| KR | 20210157610 A | 12/2021 |
|---|---|---|
| KR | 20220015287 A | 2/2022 |
| WO | WO-2022112260 A1 * | 6/2022 |

OTHER PUBLICATIONS

"Learn to Build a Better Business Plan", Retrieved from: http://web.archive.org/web/20210701150855/https:/www.bplans.com/, Jul. 1, 2021, 9 Pages.

Balasubramanian, et al., "Topic Pages: An Alternative to The Ten Blue Links", In Proceedings of the IEEE Fourth International Conference on Semantic Computing, Sep. 22, 2010, pp. 353-360.

Du, et al., "Leveraging Structured Metadata for Improving Question Answering on the Web", In Proceedings of the 1st Conference of the Asia-Pacific Chapter of the Association for Computational Linguistics and the 10th International Joinl Conference on Natural Language Processing, Dec. 4, 2020, pp. 551-556.

Jain, et al., "Identifying Collaborative Conversations using Latent Discourse Behaviors", In Proceedings of the 21th Annual Meeting of the Special Interest Group on Discourse and Dialogue, Jul. 1, 2020, pp. 74-78.

Lee, et al., "Modeling Human Mental States with an Entity-based Narrative Graph", In Proceedings of the Conference of the North American Chapter of the Association for Computational Linguistics: Human Language Technologies, June 6, 2021, pp. 4916-4926.

Lee, et al., "Weakly-Supervised Modeling of Contextualized Event Embedding for Discourse Relations", In Publication of the Findings of the Association for Computational Linguistics, Nov. 16, 2020, pp. 4962-4972.

Pacheco, et al., "Modeling Content and Context with Deep Relational Learning", In Journal of Transactions of the Association for Computational Linguistics, vol. 9, Mar. 2021, pp. 100-119.

Sauper, et al., "Automatically Generating Wikipedia Articles: A Structure-Aware Approach", In Proceedings of the Joint Conference of the 47th Annual Meeting of the ACL and the 4th International Joint Conference on Natural Language Processing of the AFNLP, Aug. 2, 2009, pp. 208-216.

Sleimi, et al., "Automated Recommendation of Templates for Legal Requirements", In Proceedings of the IEEE 28th International Requirements Engineering Conference, Aug. 31, 2020, 12 Pages.

Widmoser, et al., "Randomized Deep Structured Prediction for Discourse-Level Processing", In Proceedings of the 16th Conference of the European Chapter of the Association for Computational Linguistics, Apr. 19, 2021, pp. 1174-1184.

Yang, et al., "Unsupervised Template Learning for Fine-Grained Object Recognition", In Journal of Advances in Neural Information Processing Systems, vol. 25, Dec. 3, 2012, pp. 1-9.

Lam, et al., "Detection of Similar Legal Cases on Personal Injury", In Proceedings of the International Conference on Data Mining Workshops, Dec. 7, 2021, pp. 639-646.

"International Search Report and Written Opinion Issued in PCT Application No. PCT/US2023/018237", dated Jul. 5, 2023, 13 Pages.

* cited by examiner

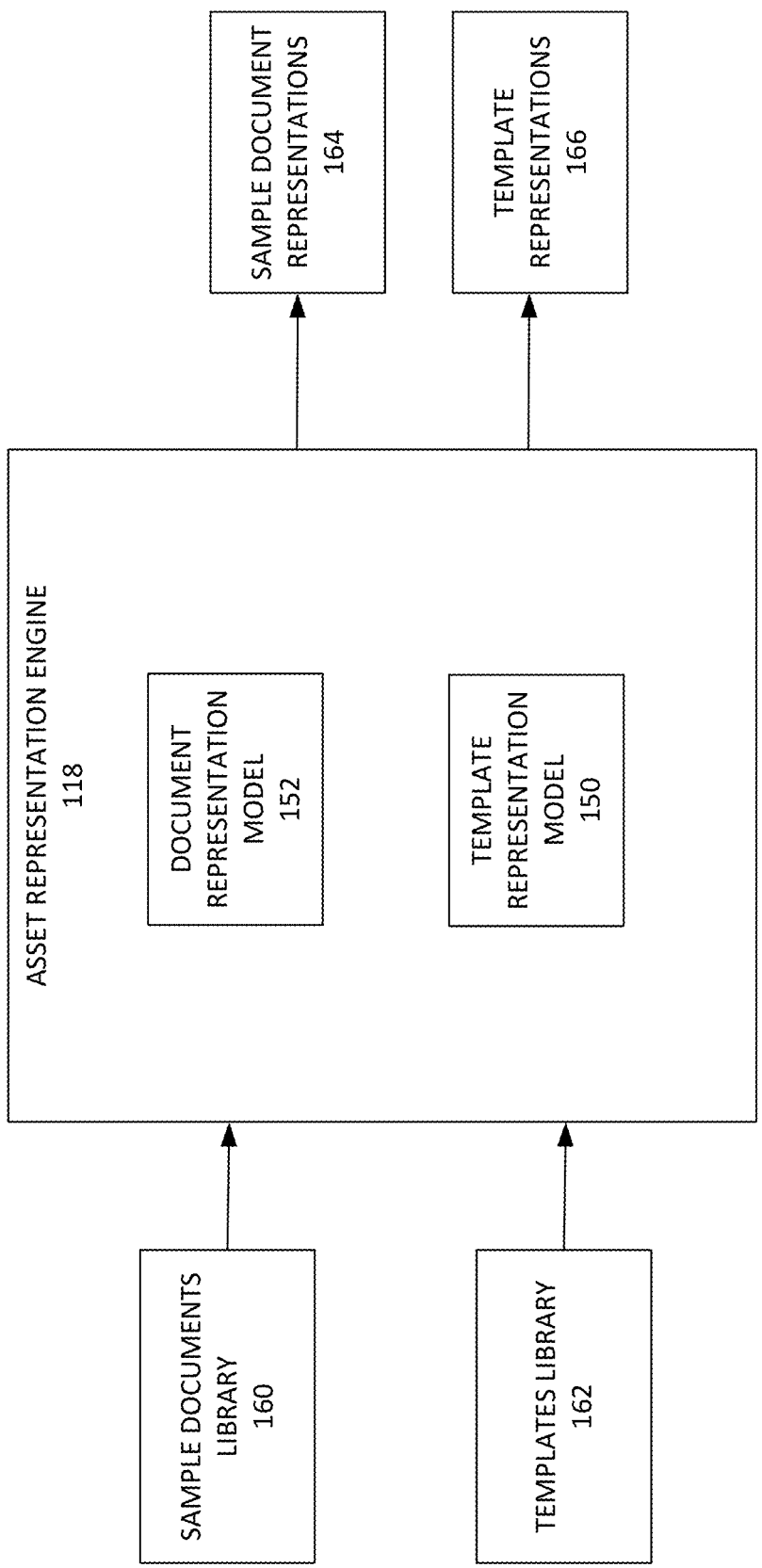

METHOD AND SYSTEM OF DISCOVERING TEMPLATES FOR DOCUMENTS

BACKGROUND

Users often create many different digital documents in their personal, professional and/or creative endeavors. Many of these digital documents fall into a few document categories. For example, a large number of documents created frequently by users fall into the categories of resumes, presentations, budgets for the family, task lists and menus. Many of these classes of documents correspond with broad categories of templatic usage, where a vast swath of users captures similar kinds of inform ad on in structurally similar ways. To enable more efficient creation of such documents, some document creation applications provide a collection of templates for creation of frequency used types of documents. These templates generally provide a structure and professional design for the documents, thereby helping users arrive at a finished document more efficiently.

Despite the availability of many such templates, their use is often limited. Instead, many users, even when they wish to create a document that follows broadly templatic patterns, begin with a blank document. The infrequent use of templates by users is often the result of users not being aware of the availability of the templates or not knowing how to find the correct template. For other users, the amount of time and effort required to search for and locate the correct template may be more than they are willing to invest. This often results in the users spending much more time than necessary to create a document. Furthermore, the resulting document often does not have the structurally professional design that it would have if the user had utilized a template.

Hence, there is a need for improved systems and methods of discovering templates for documents.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request to identify a template from among a plurality of available templates for a document, the plurality of templates being templates that are available for use in an application; encoding the content and structure of the document into one or more embedding representations via a trained document encoder; comparing, the one or more embedding representations to a plurality of template representations, each of the plurality of template representations being a representation of content and structure of one of the plurality of templates; identifying, based on the comparison, at least one of the plurality of the templates as corresponding to the document; and providing the identified at least one of the plurality of the templates for display as a recommended template.

In yet another general aspect, the instant disclosure presents a method for identifying a template for a document. In some implementations, the method includes receiving a request to identify the template from among a plurality of available templates, the plurality of templates being templates that are available for use in an application. After receiving the request, the content and structure of the document are encoded into one or more embedding representations via a trained document encoder and the embedding representations are compared to a plurality of template representations, each of the plurality of template representations being a representation of content and structure of one of the plurality of templates to identify one of the plurality of the templates as corresponding to the document. The identified template is then provided for display as a recommended template.

In a further general aspect, the instant application describes a non-transitory computer readable medium on which are stored instructions that when executed cause a programmable device to perform function of receiving a request to identify a template from among a plurality of available templates for a document, the plurality of templates being templates that are available for use in an application; encoding the content and structure of the document into one or more embedding representations via a trained document encoder; comparing, the one or more embedding representations to a plurality of template representations, each of the plurality of template representations being a representation of content and structure of one of the plurality of templates; identifying, based on the comparison, at least one of the plurality of the templates as corresponding to the document; and providing the identified at least one of the plurality of the templates for display as a recommended template.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2A depicts an example of some of the elements involved in generating document and template representations.

DETAILED DESCRIPTION

Figure 1A:
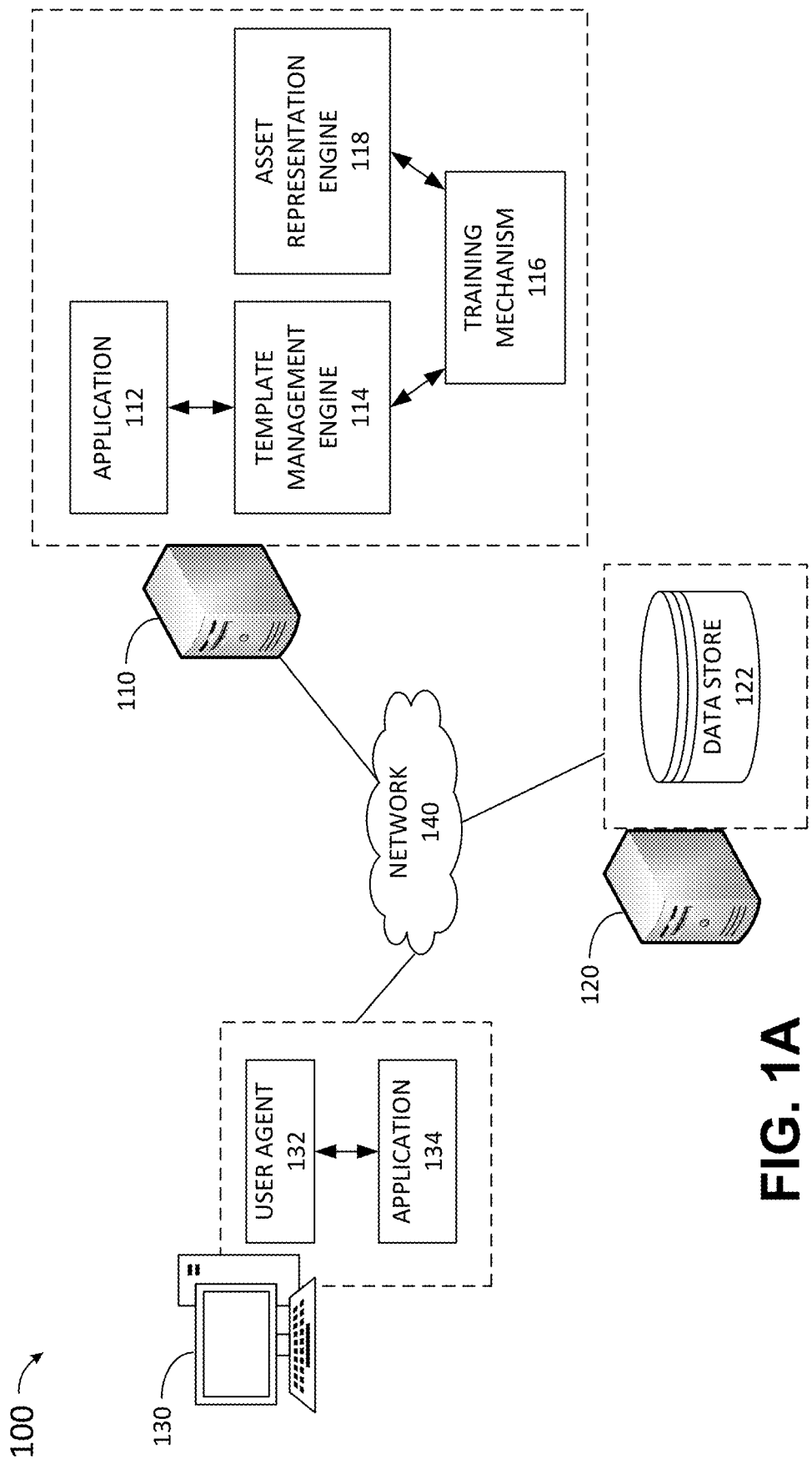
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications provide templates for various frequently used classes of documents in order to assist the users create a document and/or improve the quality of a document they are working on. To create the document more quickly and/or structure the document more aesthetically pleasing, the user may choose to utilize a template that provides the structure for the document they are trying to create. For example, a template for a resume may provide the location of the user's name and contact information, various headings, sections for job experience and education and the like. The user may start with such a template and then simply insert their own information, instead of starting from scratch. However, while many such templates are offered by document creation applications, their use is often limited. That is often because many users are unaware of the availability of such templates or do not know how to access them. Furthermore, when many templates are available for use, finding the correct template that corresponds with the user's desired document may become too time-consuming and confusing. Thus, there exists a technical problem of lack of efficient mechanisms for identifying and utilizing correct templates for document creation.

Furthermore, while use of a template can be very helpful in creating the structure of a document, sometimes users require more help than the structure. For example, sometimes users require help with creating the content of the document. As an example, while a business plan template may help provide the overall structure and different sections needed for a business plan, it is unlikely to help a user generate a mission statement. To write the mission statement, the user may need to review one or more examples of business plans that include mission statements. To achieve this, users often spend a lot of time and energy searching through many documents on the web to locate an appropriate sample document. Thus, there exists another technical problem of lack of mechanisms for efficiently identifying documents that correspond with and can be used in helping a user create a document they are working on.

Moreover, while template curators have developed many templates that are helpful to users, there may be other types of documents that are frequently created by users but for which a template does not exist. Identifying these types of documents may take a lot of time and customer feedback. Furthermore, even when the need for a specific type of document is identified, manually creating the template may take a lot of time and effort. Thus, there exists another technical problem of lack of mechanisms for automatically identifying the need for a new type of template and automatically creating a template as needed.

To address these technical problems and more, in an example, this description provides technical solutions for intelligently identifying templates and/or sample documents for use in creating a document based on the content and structure of the document being created. This may be achieved by utilizing a machine learning (ML) model that analyzes both the content and structure of an input document and compares the content and/or structure to content and/or structure of available templates and/or sample documents to identify matching templates and/or sample documents. The trained ML model may be able to make alignments at the section level of documents, and as such enable fine-grained resolution of document paragraphs to templates. Given the modeling ability to create such mappings, one or more matching templates can be recognized for a given document (e.g., partially completed document). The identified templates and/or sample documents may then be presented to the user as recommendations for use in creating or completing the document. For example, the user may be prompted with a suggestion to format or continue creating their document by using an identified template. The suggestions may provide contextual support and guidance to users who are in the flow of creating their documents. The process of template identification may involve use of a framework that converts pre-designed templates and/or sample documents to representations that can be used by a trained ML model in quickly matching the content and structure of the input document with the pre-designed templates and/or sample documents. In some implementations, a classifier is used to predict type and subtype of an input document, a document encoder to determine alignment with templates and/or sample documents, a notification system for creating a notification when a desired templates is not offered by an application, and a template generator for automatically creating templates. By using the document being created as an input, the system enables users to quickly and efficiently identify templates and/or sample documents that are likely to correspond with the input document.

The technical solution described herein addresses the technical problem of inadequate, inefficient and/or inaccurate mechanisms for searching for and identifying templates and/or sample documents that can be used in creating a document and achieves technical effects by providing a system and method for intelligently mapping both the content and structure of an input document to content and structure of pre-designed templates and/or sample documents. By taking into account both the content and the structure of the input document and the templates and/or sample documents, the technical solution enables more accurate mapping and identification of templates and/or sample documents. Furthermore, the technical solution allows a user to quickly and efficiently identify and/or receive recommendations for one or more templates and/or sample documents, and therefore improves graphical user interfaces for electronic devices. The technical effects include at least (1) improving the efficiency and accuracy of using an electronic device to create documents by providing a mechanism for receiving recommendations for templates and/or sample documents to use in creation of the document; (2) improving the efficiency and accuracy of template identification by providing a mechanism for automatically identifying templates and/or sample documents based on the content and structure of the document being created; and (3) improving the efficiency of the template generation process by creating automatic notifications to template curators and/or automatically creating templates from pre-designed templates.

As used herein, the term "template," may refer to a pre-designed document that includes a specific structure and can be used in creating an electronic document. Examples of templates include a resume template, a menu template, a business plan template, a business card template, an invitation card template and the like. The term "sample document"

as used herein may refer to any type of electronic document that can be provided as a sample for use in creation of another document. Moreover, the term "asset" may be used to refer to both templates and sample documents. Furthermore, as used herein, the term "input document" may refer to an open document that is in the process of being created and can be used as an input for identifying a matching template and/or sample document.

FIG. 1A illustrates an example system 100, upon which aspects of this disclosure may be implemented. The system 100 may include a server 110, which may itself include an application 112, a template management engine 114, an asset representation engine 118, and a training mechanism 116. While shown as one server, the server 110 may represent a plurality of servers that work together to deliver the functions and services provided by each engine or application included in the server 110. The server 110 may operate as a cloud-based server for offering template/sample document identification in one or more applications such as application 112 and/or application 134. The server 110 may also operate as a shared resource server located at an enterprise accessible by various computer client devices such as a client device 130.

The server 110 may include and/or execute a template management engine 114, which may receive a request for identifying a template and/or sample document for use in creating a document from an application such as the application 112 or 134 and may process the request by identifying one or more templates and/or sample documents that correspond with the request. The request may be an explicit search request submitted by a user via a UI associated with the application 112 or 134. Alternatively, the request may be transmitted automatically via the application 112 or 134 to provide automatic template/sample document recommendations to the user. For example, the application 112 or 134 may examine the content of a document a user is interacting with, determine based on the actions of the user and/or other parameters that the user is creating a specific type of document and generate a request for identifying corresponding templates/sample documents based on the content and structure of the input document. Upon receiving the request, the template management engine 114 may utilize one or more classifiers to classify the input document and may compare the classified document with representations created for available templates/sample documents to identify one or more templates/sample documents that correspond with the input document.

The template management engine 114 may include separate modules for classifying the input document, comparing the input document to templates/sample documents and/or management of templates. For example, the template management engine 114 may include a separate element for comparing the classified input document with indexed templates/sample documents to identify one or more templates/sample documents that correspond with the input document. One or more modules and elements of the template management engine 114 may include one or more ML models. The internal structure of and data flow between the various elements of the template management engine 114 is discussed in greater detail with respect to FIG. 2B.

One or more ML models implemented by the template management engine 114 and/or asset representation engine 118 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of one or more ML model to perform natural language process (NLP), vectorize templates and/or sample documents, analyze content and/or structure of an input document and identify matching templates/sample documents for an input document. ML generally involves various algorithms that can automatically learn over time. The foundation of these algorithms is generally built on mathematics and statistics that can be employed to predict events, classify entities, diagnose problems, and model function approximations. As an example, a system can be trained using training data in order to identify patterns in different types of documents, determine associations between various words and structures, identify keywords and/or classify documents. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model or other type of training mechanism (which may be referred to as an "ML model trainer") configured to generate a trained ML model from training data obtained from a training data repository or from device-generated data. The generation of both the initial ML model and the trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The asset representation engine 118 may operate to convert one or more templates/sample documents into numerically dense vector embeddings. To achieve this, the asset representation engine 118 may make use of separate ML models for templates and sample documents. For example, the asset representation engine 118 may include an ML model for converting templates to vector representations, and another ML for converting sample documents to vector representations. Further details regarding the operation of the asset representation engine 118 is provided in greater detail with respect to FIG. 2A.

The system 100 may include a server 120 which may be connected to or include the data store 122 which may function as a repository in which databases relating to training models, template libraries, sample document libraries and/or vectorized representations of assets may be stored. Although shown as a single data store, the data store 122 may be representative of multiple storage devices and data stores which may be accessible by one or more of the template management engine 114, asset representation engine 118, training mechanism 116, and applications 112/134.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 5 and 6.

The client device 130 may include a local application 134. The application 134 may be a computer program executed on the client device that configures the device to be responsive to user input to allow a user to interactively create, edit, and/or review a document. The application 134 may also enable the user to interactively submit a request and receive template/sample document recommendations. Examples of suitable applications include, but are not limited to, a word processing application, a presentation application, a note taking application, and communications application, and a spreadsheet application. In some implementations, the client device 130 may include a local template management engine for performing offline template recommendations. The local template management engine may be a lite (e.g., simplified) version of the template management engine 114 that enables quick searching and identification of matching templates.

In some examples, the application used to submit a request for and receive template/sample document recommendations is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. User data from the application 134 or application 112 may be provided via the network 140 to the template management engine 114 for use in providing template/sample document recommendations.

Figure 1B:
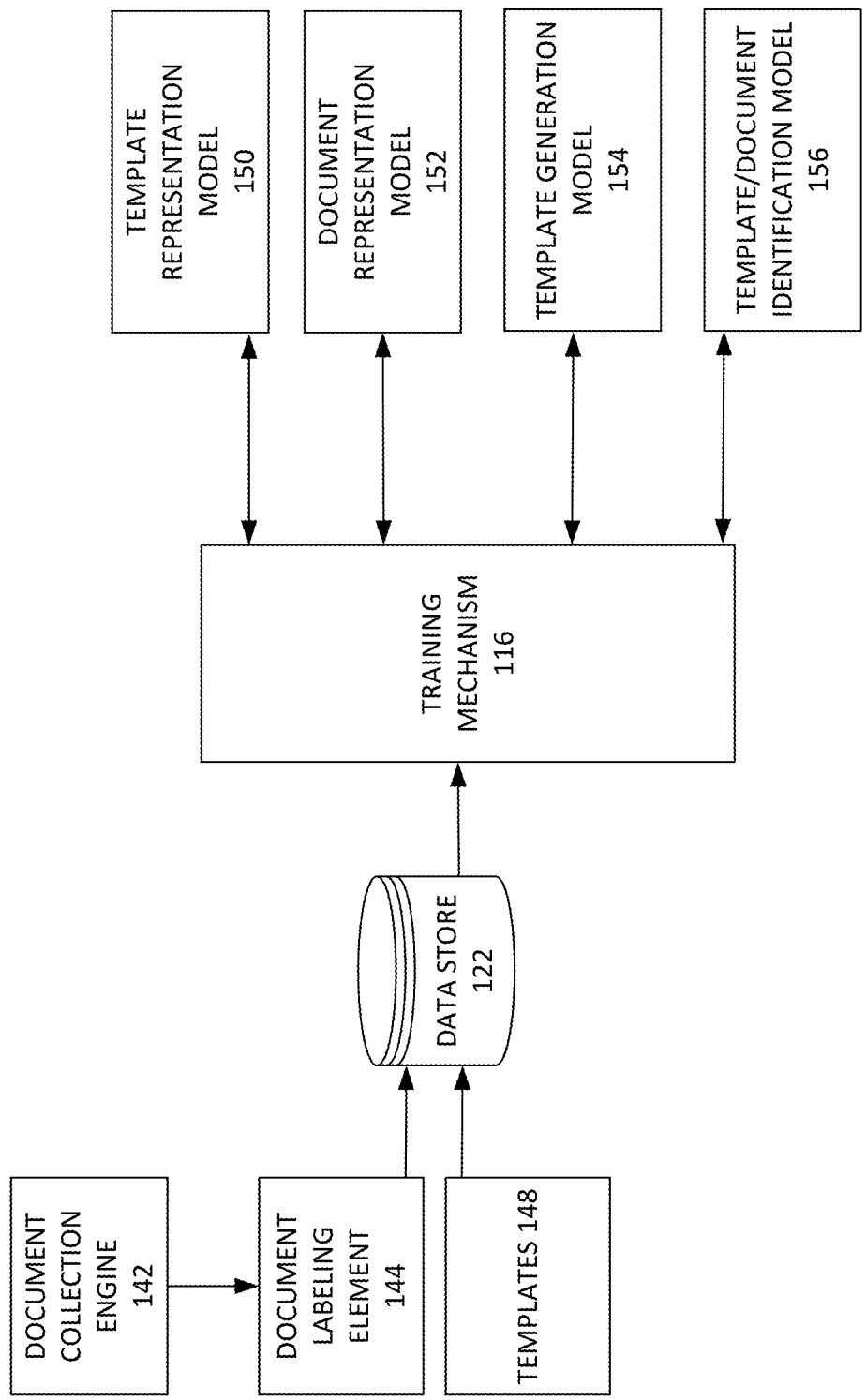
FIG. 1B depicts an example of some elements involved in training one or more ML models used in template identification and management.

FIG. 1B depicts how one or more ML models used by the template management engine 114 and asset representation engine 118 may be trained by using the training mechanism 116. The training process may involve collection of documents and templates for use in training the models. In an example, this involves the use of a document collection engine 142. The document collection engine may include automatic and/or manual elements for collection of documents that can be used in training the models. This may involve first creating a list of document types and keywords associated with each document type. In an example, document types may include resumes, menus, business plans, letters, task lists, invitations, business cards, and the like. The list may be created based on the categories of templates offered by an application. Once the list of document types is created, keywords associated with those document types may be used in a search engine to search for publicly available documents that correspond with the desired document types. In an example, this may be done by utilizing a web search engine. To enable collection of more relevant documents, the type of file desired may also be specified in searching for documents. For example, if the template identification model is being trained for identifying templates offered by Microsoft Word®, then the document collection engine 142 may search for and collect Microsoft Word® documents. In alternative implementations, documents may be collected from other sources and/or may be created specifically for training the models.

Once a desired number of documents have been collected, the document labeling element 144 may label the collected documents. The document labeling element 144 may be fully automatic or may make use of individuals that manually review and annotate the collected documents. In some implementations, a fully automatic document labeling element 144 categorizes documents based on keywords used to search for each document. Manual labeling, on the other hand, may involve reviewing each collected document and responding to specific questions about each document that map the documents to template categories. For example, the reviewer may provide responses to a question about whether a document includes a business plan, whether the document is a template or a clear example of a business plan, which pages of the document include the business plan (e.g., some documents may include multiple business plans, or multiple types of documents) and the relevant template to which the document corresponds. In some examples, in addition to identifying document types, subtypes may also be identified and labeled. For example, in addition to identifying a document as a letter, the reviewer may also determine that the document is a recommendation letter. The labeling process may also identify documents that are not clear instances of a document type but are related to the document type. For example, a document that provides tips for writing resumes is not an example resume but is related to resumes. These related documents may be labeled as such and used as negative examples for training some of the models. Documents that are identified as not being relevant instances of the desired document categories may be removed from the collection. The labeled documents may then be provided to the data store 122 as training data for storage.

In addition to collecting and labeling sample documents as training data, available templates 148 may also be provided as a training data set. In an example, templates 148 are first collected from a library of templates offered by an application. The collected templates 148 may then be labeled with the type and/or subtype of the document they represent (e.g., student resume, basic resume, etc.). The labeling may be done manually or may be done automatically based on information associated with the template (e.g., the name of the template or metadata associated with the template). The resulting collected templates may be stored as a template training dataset in the data store 122. The collected documents and templates may be utilized by the training mechanisms 116 in training one or more of the template representation model 150, document representation model 152, document encoder 178, template creation model 154 and template/document identification model 156.

In some implementations, to provide ongoing training, the training mechanism 116 may use training data sets received from each of the ML models. Furthermore, data may be provided from the training mechanism 116 to the data store 122 to update one or more of the training datasets in order to provide updated and ongoing training. Additionally, the training mechanism 116 may receive training data such as knowledge from other pre-trained mechanisms. The models may be initially trained in an offline phase. Once the models are trained, ongoing training may be done in a zero-shot unsupervised manner that does not require labeling.

FIG. 2A depicts an example of some of the elements involved in generating document and template representations for use in identifying templates/sample documents. Sample documents in a sample documents library 160 may be supplied to the asset representation engine 118 such that the sample documents can be converted to sample document indices for efficient searching and matching. The documents in the sample documents library 160 may be collected from public resources such as the Internet. For example, sample documents corresponding to multiple categories of documents (e.g., categories corresponding to template categories for an application) may be collected by utilizing search engines. The collected documents may be reviewed manually to ensure their relevance to the desired document categories and may be labeled as corresponding to specific document types and/or subtypes. Alternatively, sample documents may be created manually or collected from user data after receiving user consent, and then categorized/labeled. The labeled documents may then be stored in separate document libraries. For example, a document library may be created for sample resumes, while a separate document library is created for sample letters. The sample documents library 160 may include a plurality of these sample document libraries. The sample documents may be documents that can be used by users as samples for creating specific types of documents (e.g., business plans, resumes, menus, etc.).

In addition to sample documents, the asset representation engine 118 may also receive templates of the templates' library 162. The templates may include all or some of templates offered by an application. In an example, only templates that correspond to categories of documents being created on a frequent basis are provided to the asset representation engine 118 for conversion. The sample documents in the sample documents library 160 and the templates in the templates library 162 may be stored in a storage medium such as the storage server 120 of FIG. 1A (e.g., in data store 122). Alternatively, different portions of the sample documents library 160 and/or templates library 162 may be stored in different storage mediums.

The asset representation engine 118 may include various elements for processing the received sample documents and templates. In an example, the document representation model 152 of the asset representation model 118 may receive the sample documents of the sample documents library 160 for conversion. The document representation model 152 may be representative of a trained representation model for converting different sample documents into vector representations. In an example, the sample representation model 152 may represent different representation models for different categories of sample documents (e.g., a resume representation model, a business plan representation model, etc.).

The document representation model 152 may analyze and process both the content and structure of the documents in the sample documents libraries 160 to convert the sample documents to vectors embedding that are representative of the content, structure and/or category of the document each document belongs to. Thus, the document representation model 152 may convert the content and structure of the sample documents to a multi-dimensional vector space. In some implementations, the vector space has the same number of dimensions as the vector space into which the input document is converted. In other implementations, the vector space for the sample documents may have a different number of dimensions as the vector space for the input document, in which case, another model may be used to predict whether the sample documents are relevant to an input document. Each sample document in the sample documents library 160 may be encoded into one or more representations. Similarly, templates in the templates library 162 may be converted by the template representation model 150 to vector embeddings that can be used in efficient search and identification of templates. In some implementations, the templates and sample documents are converted to vector representations by the same model. Once the sample documents and templates are converted to vector representations, they may be transmitted to one or more representation libraries for storage. In some implementations, the libraries are stored in a storage medium such as the data store 122 of FIG. 1A.

The process of converting sample documents and templates to vector representations may occur offline and may only need to occur once. Thus, when the document representation model 152 and/or template representation model 150 are trained, they may process the sample documents in the sample documents library 160 and the templates in the templates' library 162, respectively, to convert the sample documents and templates to vector representations. This process may not need to be repeated in the future unless new sample documents/templates are added to the libraries, a new library is added, or the underlying models are retrained/continuously trained. The content representation models 166 are trained to convert new content to encoding representations that can be easily used in a search. As such, by utilizing the document representation model 152 and template representation model 150, the technical solution provides a mechanism for template management systems to identify relevant templates/sample documents quickly and efficiently and thus significantly improve user satisfaction.

Figure 2B:
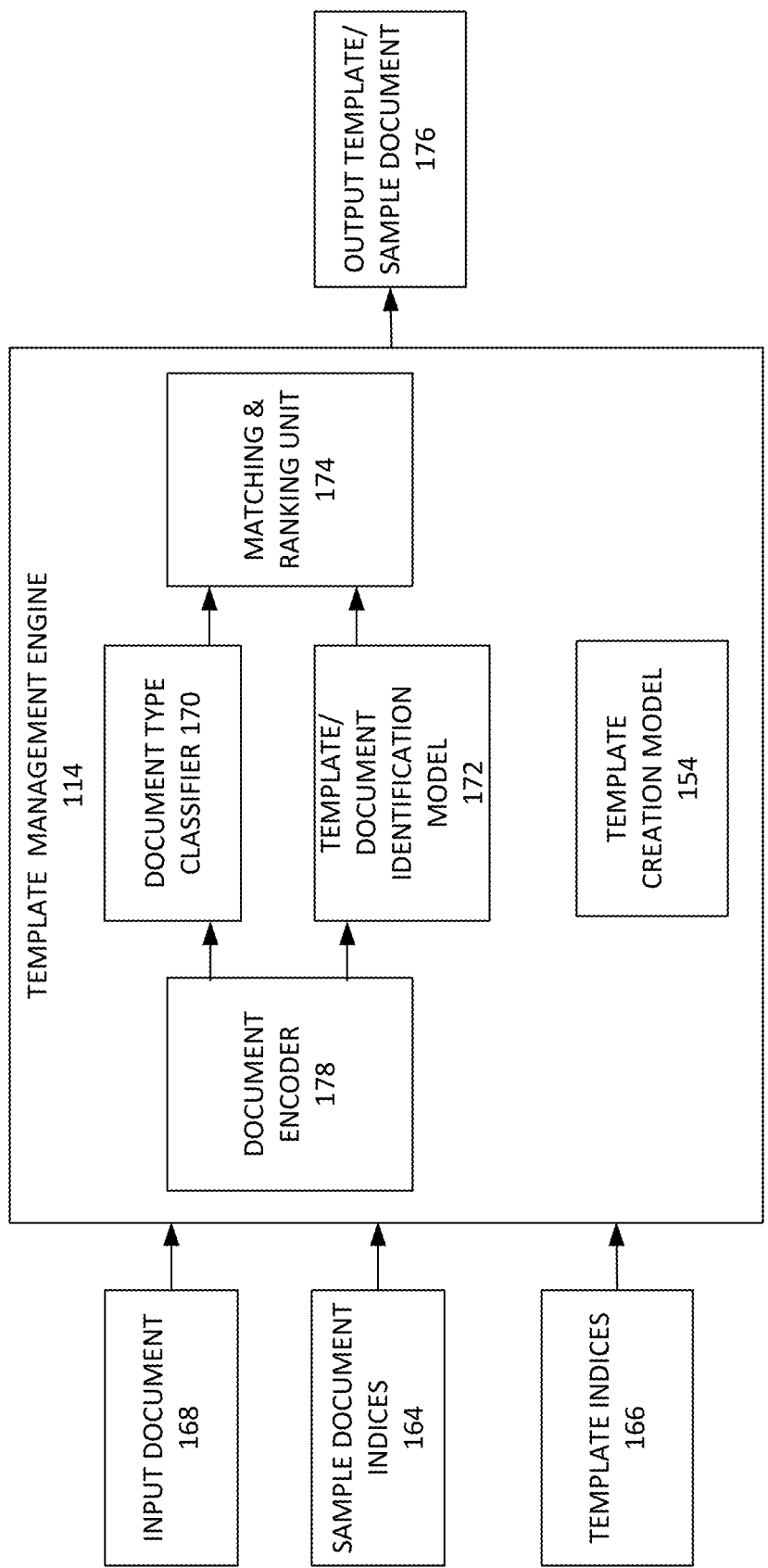
FIG. 2B depicts an example of some elements involved in managing templates/sample documents.

FIG. 2B depicts an example of some elements involved in managing templates/sample documents. The template management engine 114 may include a document classifier 170, template/document identification model 172, matching and selection unit 174, and template generation model 154. A user who is creating a document may submit a request for identifying templates and/or sample documents that can be used in completing the process of creating the documents. The request may be received via an application that offers templates for use in document creation and may include the input document 168. The request may be submitted by a user (e.g., explicit request) or it may be generated by the application (e.g., implicit request). For example, the application may determine that the user is creating a document and automatically submit a request for identifying templates/sample documents that can assist the user in creating their document. The input document 168 may be a partially completed document that includes some content and/or structure. For example, the input document 168 may include text and structure such as headings, paragraph numbers, bullets, and the like. Thus, the input document 168 may have templatic pattern that can be used to identify a corresponding template.

Once the input document 168 is received by the template management engine 114, it may be provided to the document encoder 178 for encoding the content and/or structure of the document into encoding representations. The documents encoder 178 may be a trained document representation ML model for converting the input document 168 into vector representations. The representation model may encode the input document in a similar manner as that of the document representation model 152 such that the input document representations correspond to the embedding representations of the sample document representations 164 and/or template representations 166.

The representations may then be provided to the document type classifier 170 for processing. The document type classifier 170 may be a classifier trained for identifying document types based on the content and/or structure of the document. The classifier 170 may examine both keywords and structure of the input document 168 to classify its type. This may be done by comparing characteristics of the content and structure of the input document 168 to characteristics of specific document types (e.g., resumes, menus, etc.) and determining if the input document 168 corresponds with any of the specific document types. In an example, the document type classifier 170 can identity both the document type and the document subtype, when one exists. When the input document 168 is classified as corresponding with a specific type of document, that information may be transmitted to the matching and ranking unit 174 for further processing. In some implementations, the prediction of the document types is done in a binary manner (e.g., for each document type, the output is true or false) such that new document types can be added, as needed, without the need to retrain the document type classifier 170.

In addition to comparing the input document 168 to specific document types, the input document 168 may also be compared to templates and/or sample documents to identify templates and/or sample documents that have similar characteristics as that of the input document 168. This may be done by the template/document identification model 172, which may operate as an alignment classifier. In some implementations, the template/document identification model 172 aligns features of the input document 168 with features of templates and/or sample documents to identify matching templates and/or sample documents. This may involve examining the content (e.g., text) of the documents, as well as examining structure of the document. To examine structure, the document structure of the input document may first be extracted. Document structure may be extracted using a rule-based mechanism. This may involve analyzing the distribution of occurring character style features, annotating each identified paragraph in a document with its predominated style, categorizing each paragraph into header or content and recreating the document as a general tree structure. As such, structure may include parameters such as headings and subheadings and tree features such as the number of nodes, depth of the tree structure and the like which are extracted from the tree-file structure. The extracted structure may then be compared with extracted structure of the templates and/or sample documents. This information may be available in the sample document representations 164 and/or template representations 166. In some implementations, the template/document identification model 172 also utilizes an expectation step, as is known in the art, to estimate alignment by fixing gold labels for document type and document subtype. Parameters for type, subtype may then be estimated using the alignment predictions of the expectation step.

In some implementations, the template/document identification model 172 makes use of the sample document representations 164 and/or template representations 166 and compares those representations to vector representations of the input document 168 to identify one or more templates and/or sample documents that have a high similarity score with the input document 168. This may be done by utilizing the cosine vector similarity metric to estimate the degree of similarity between the input document 168 and one or more sample documents and/or templates.

The similarity scores may then be transmitted to the matching and ranking unit 174. The matching and ranking unit 174 may then rank the templates and/or sample documents according to their similarity scores. The templates and/or sample documents having high similarity scores (e.g., top 5) may then be compared with the identified document type received from the document type classifier 170 to determine if the top templates and/or sample documents correspond with the identified document type. This provides an additional mechanism for reviewing accuracy of the models and ensuring that correct templates and/or sample documents are identified. When there is consistency between the identified document type and the top templates and/or sample documents, templates that correspond with the identified document type may be given higher ranking than other templates. Some of the most highly ranked templates and/or sample documents may then be selected by the matching and ranking unit 174 as the recommended results. In an example, the matching and ranking unit 182 selects templates and/or sample documents whose similarity score exceeds a threshold similarity measure as the recommended results.

Once the recommended results are ranked and selected, they may be transmitted as the output template/sample document 176 to the application that submitted the request. In some implementations, a link to the identified template/sample document is provided to the application which can in turn use the link to retrieve the identified template/sample document.

The modular construction of the framework used to identify and matching templates and/or sample documents, both in terms of separate computation and the different phases of training, creating representations and online usage, provides significant advantages for operating, analyzing, maintaining, and periodically updating the underlying models. For example, the document type classifier 170 may be independently updated to incorporate new document types. This can occur independent of some of the other models, thus providing an efficient mechanism for maintaining and updating the system. Furthermore, new templates and/or new document libraries can be added at any time without affecting any of the elements involved in the online phase.

In some implementations, in addition to identifying matching templates and/or sample documents for use in creation of documents, the technical solution described herein can make use of the framework utilized by the template management engine 114 to more efficiently create new templates when needed. This may be done by utilizing the template creation model 154. When a document structure is encountered frequently and a matching template cannot be found for the document structure, this may indicate that the application does not have any templates for a popular type of document. When the document is encountered more than a threshold number of times within a given time period (e.g., is being generated by users more than a predetermined number of times in a 7-day period), a notification may be generated by the template management engine 114. This may be achieved by keeping track of the structure and/or content documents for which a template cannot be found. The notification may be transmitted to a team of one or more developers (e.g., document curators) responsible for generating templates. The team may then examine the received data and determine if a template should be generated for the identified document type.

In some implementations, in addition or instead of generating a notification, the template creation model 154 automatically generates the template. This may be achieved by examining structure of the documents for which template should be generated, identifying patterns in the structure, searching for similarities between the identified structure and existing templates and using existing templates as guiding blocks for generating the new templates. For example, the template generation model may determine that a lot of users are creating family financial plans, determine that the family financial plans has a lot of sections that are similar to small business plans and use an existing template for small business plans to generate the similar sections of the family financial plan template. An automatically generated template may be presented to team responsible for template generation for approval and/or modification before it is adopted for use by an application.

Figure 3A:
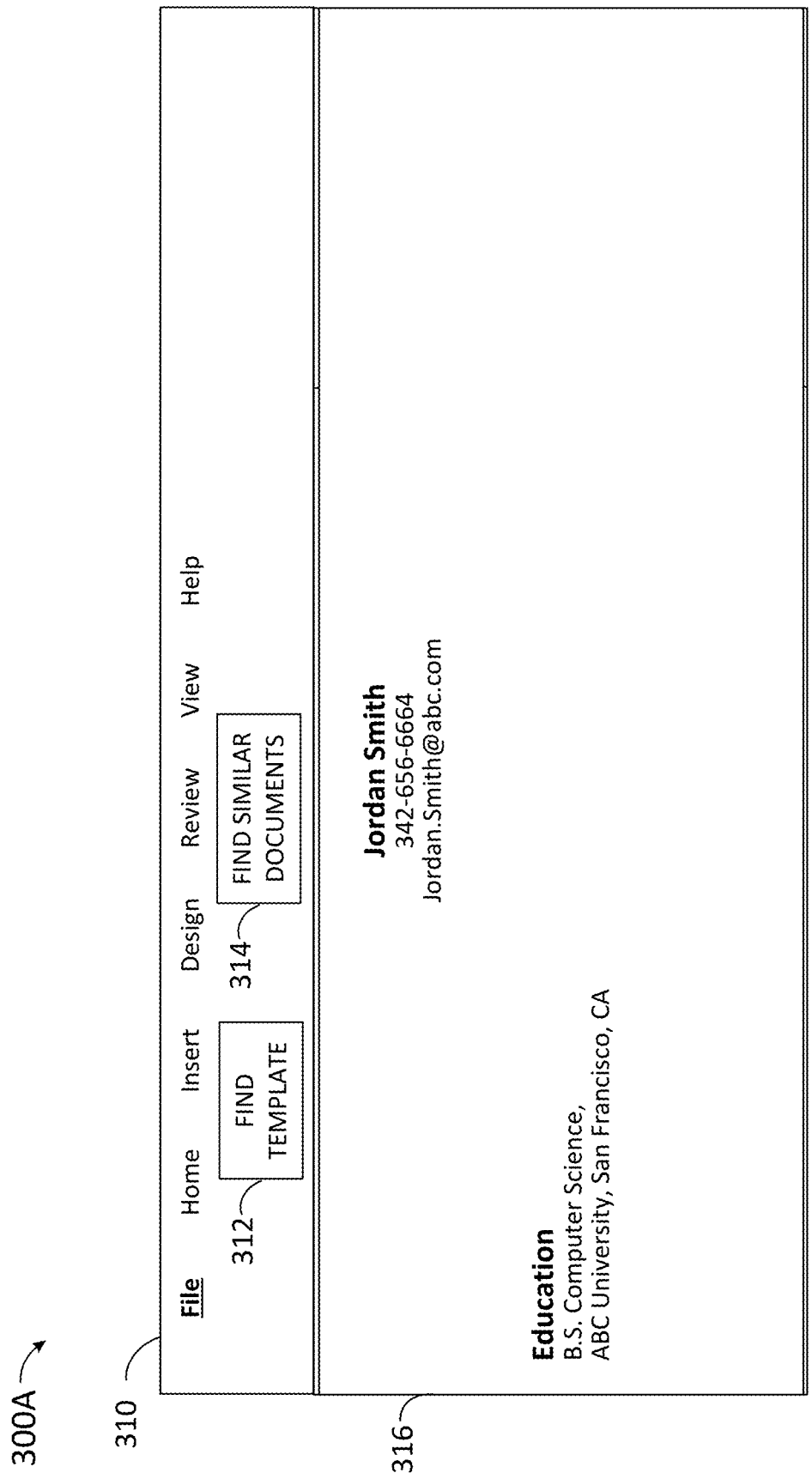
FIGS. 3A-3C depict example GUI screens of an application or service that provides template/sample document recommendations.
Figure 3B:
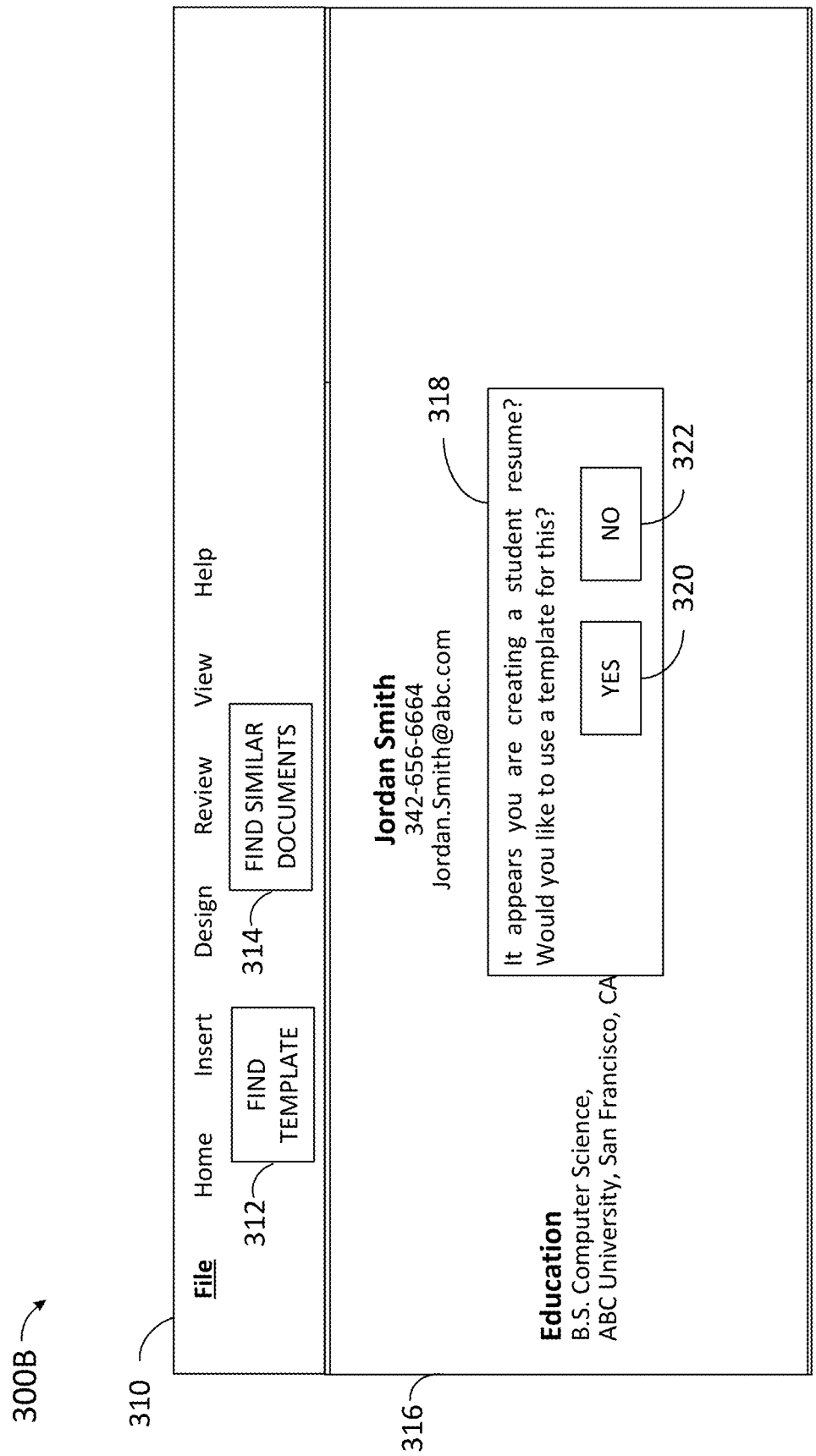
Figure 3C:
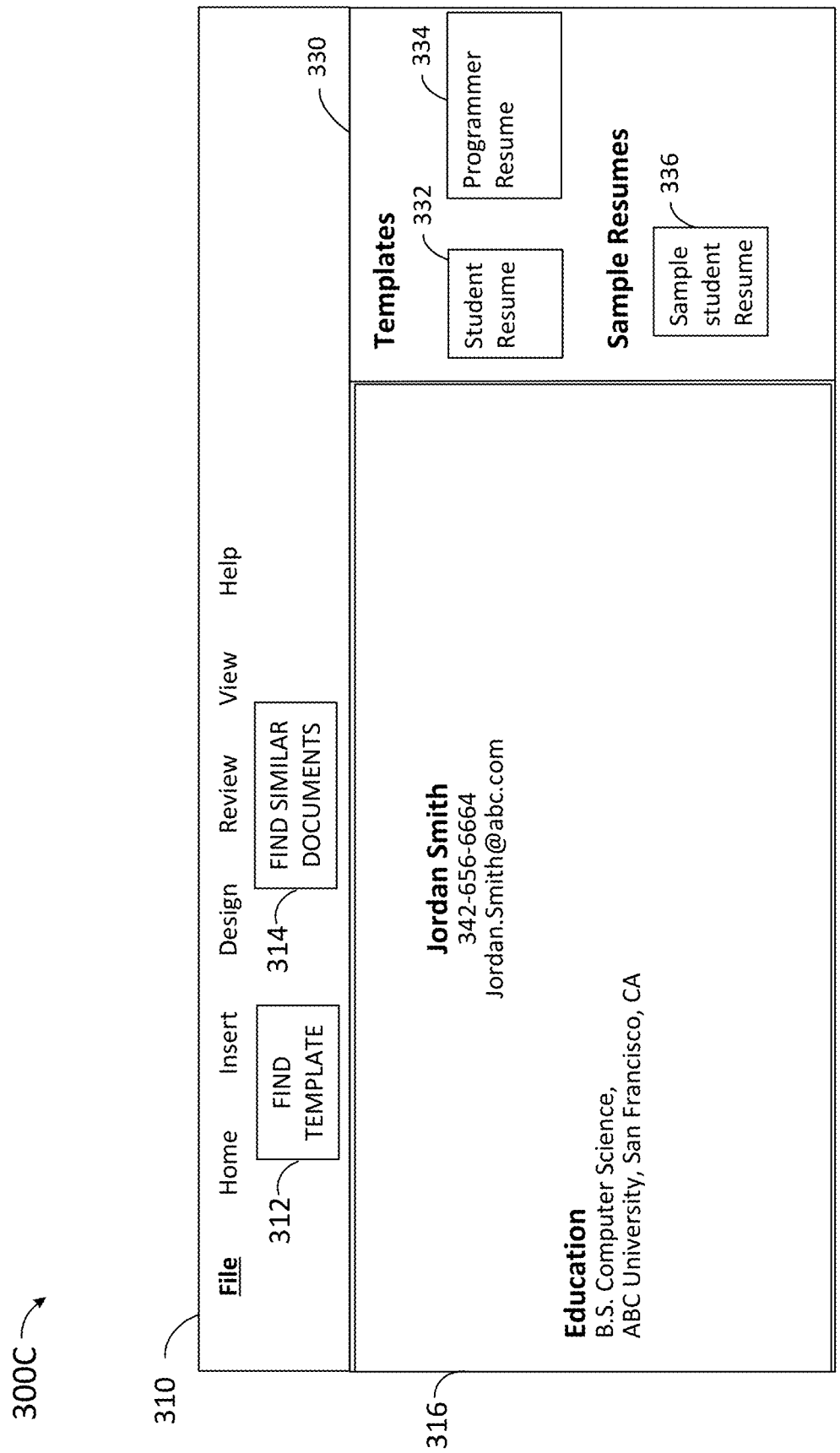

FIGS. 3A-3C depict example GUI screens of an application or service that provides template/sample document recommendations. The UI screen 300A of FIG. 3A may for example be displayed by a productivity application such as word processing application (e.g., Microsoft Word®) displaying an example document that allows users to generate word documents. In an example, the UI screen 300A of the application may include a toolbar menu 310 that may display multiple tabs each of which may provide multiple UI elements for performing various application features. For example, the toolbar menu 310 may provide options for the user to perform one or more tasks to create or edit the document. The UI screen 300A may also include a content pane 316 which may contain content. The content may be displayed to the user for viewing and/or editing purposes. For example, the user may utilize an input device (e.g., a keyboard) to insert input such as text into the contents pane 316.

As the user creates and/or edits the content of the content pane 316, the user may realize a need for utilizing a template or similar documents that would help provide the required structure and/or assist with creating the content for the application. For example, as the user is generating a resume, the user may determine a need to use a template that would offer pre-structured sections. The user may then utilize a menu option 312 to submit a request for finding templates that may be used for the user's document. Similarly, if the user determines a need to review similar documents, the user may use the menu option 314 to submit a request for finding documents that are similar to the document the user is creating. In some implementations, the application itself determines that the type of document the user is creating is one where use of a template or similar documents may be helpful in creating the document. In such instances, a notification may automatically be provided to the user to notify of them of the existence of a useful template. This is illustrated in GUI screen 300B of FIG. 3B. Other methods of submitting a request for identifying a template and/or similar documents may also be used. For example, right-clicking on the content pane 316 may result in the display of a context menu that provides an option for finding templates.

As depicted in the GUI screen 300B, a UI element 318 such as a pop-up menu may be displayed to notify the user that the type of document they are creating has a pre-designed template. The notification may include the document type the user is creating and may inquire if the user is interested in using the template for the identified type of document. The user may select to proceed with using the template by utilizing the menu option 320 or decline to use the template by clicking on the menu option 322.

When the user submits a request for finding templates and/or similar documents, a template pane 330 such as the one displayed in the GUI screen 300C of FIG. 3C may be displayed. The template pane 330 may display a list of templates identified for the document for selection. The identified templates may be displayed using thumbnails 332 and 324 that provide a preview of the template (e.g., a minimized picture of the first page of the template) and/or a descriptive title for the template. In addition, in some implementations, documents that are identified as being similar in content and/or structure to the document in the content pane 316 are also displayed in the template pane 330. For example, a thumbnail 336 may be displayed to provide a preview of a similar document. Selection of the thumbnails 332 or 334 may result in the selected template being open in a separate document. The user may then choose to continue creating their document from the opened templates or to copy and paste the content of the template to the document they are creating. Similarly, selecting the thumbnail 336 may result in the sample document being opened in a new document, from which the user can copy content. Other configurations for displaying identified templates and/or sample documents are also possible. For example, a separate pane may be displayed for templates and sample documents. In another example, the template pane 330 may only display either identified templates or identified sample documents.

Figure 4:
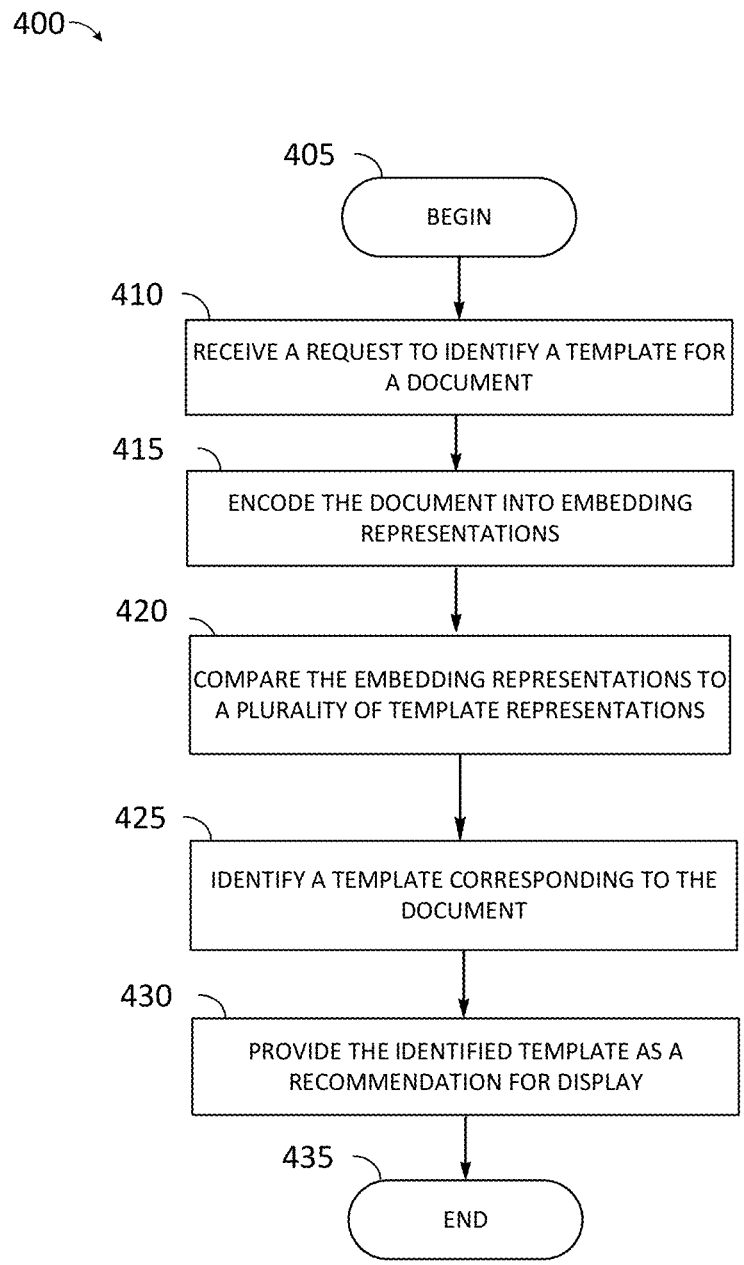
FIG. 4 is a flow diagram depicting an example method for intelligently identifying a template for a document.

FIG. 4 is a flow diagram depicting an exemplary method 400 for intelligently identifying a template for a document. One or more steps of the method 400 may be performed by a template management engine such as the template management engine 114 of FIGS. 1A and 2B, asset representation engine 118 of FIGS. 1A and 2A and/or by an application such as applications 112/134 of FIGS. 1A-1B. The method 400 may begin, at 405, and proceed to receive a request for identifying a template for a document, at 610. This may occur, for example, when a user submits a request input via a UI of an application or service that provides document creation functions. The request may be submitted while the user is creating the document. The document may be a partially completed document having templatic patterns and may be submitted along with the request for processing.

Once the request is received, content and structure of the document may be encoded via a document encoder into embedding representations, at 415. This may be done by utilizing a trained document classifier ML model that converts both the content and the structure of the input document into embeddings. The embeddings may then be compared to template representations for a plurality of templates, at 420. This may involve first retrieving template representations that have previously been generated from a library of available templates for an application. Based on the comparison, one or more templates from the plurality of templates may be identified as corresponding to the document, at 425.

In some implementations, in addition to comparing the document embedding representations to template representations, a document type is also identified for the input document. The identified document type may then be comparing to a document type for the identified templates. If the document types match with each other, the identified template may be confirmed as corresponding to the document. Once the identified template is identified and/or confirmed, the identified template may be provided for display as a recommended template, at 430, before method 400 ends at 435.

Figure 5:
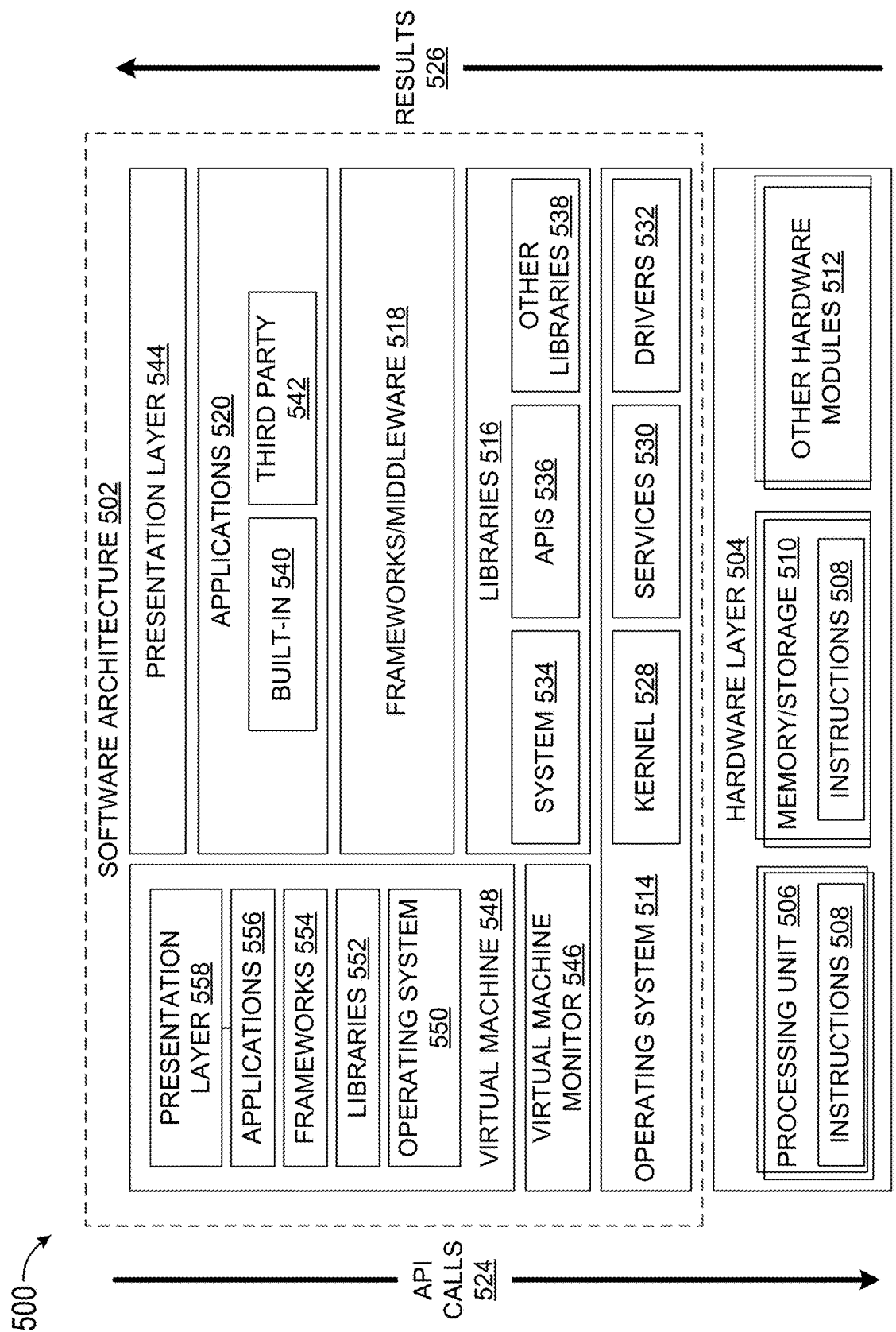
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
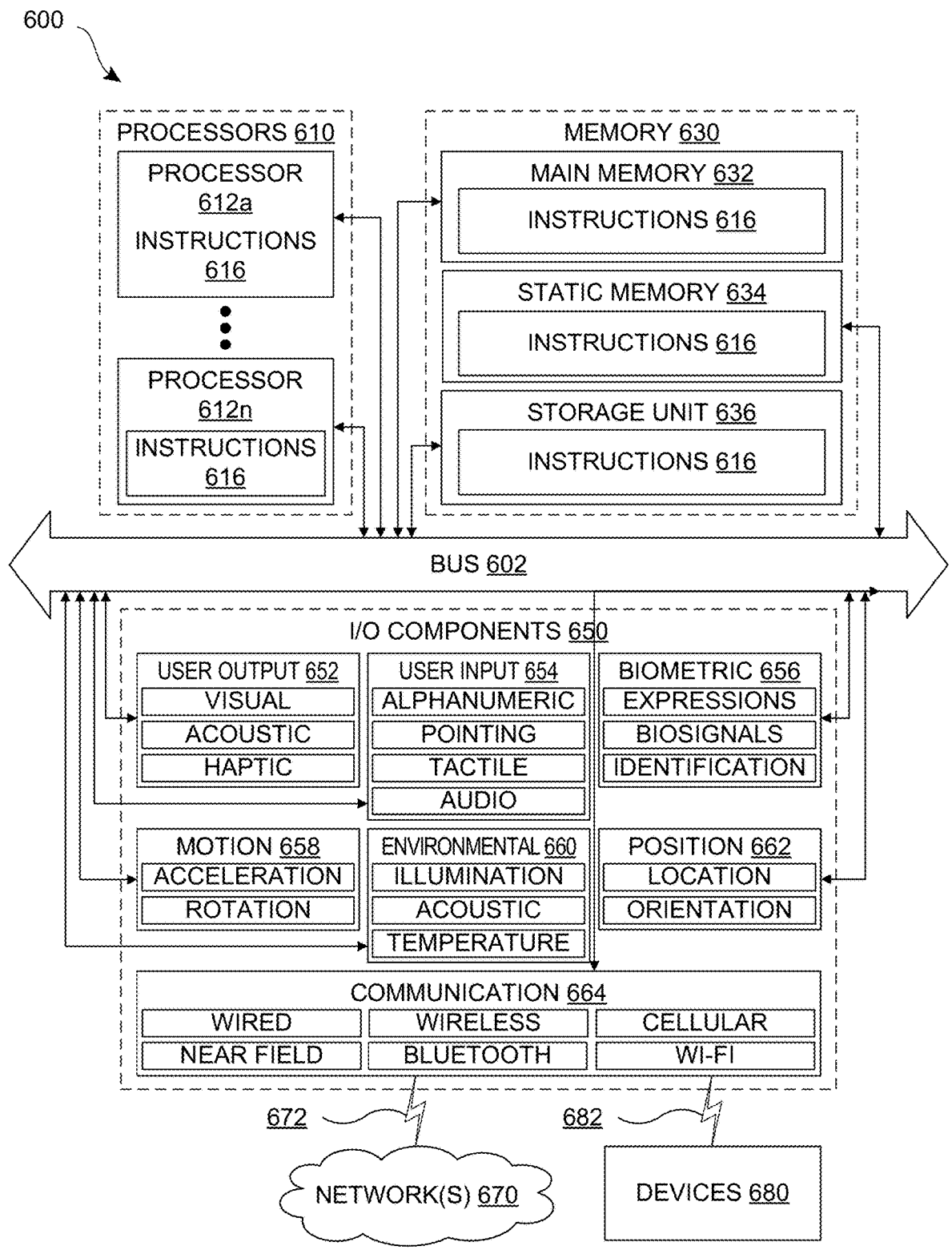
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electro-magnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a request to identify a template from among a plurality of available templates for a document, the plurality of templates being templates that are available for use in an application;
encoding the content and structure of the document into one or more embedding representations via a trained document encoder;
comparing, the one or more embedding representations to a plurality of template representations, each of the plurality of template representations being a representation of content and structure of one of the plurality of templates;
identifying, based on the comparison, at least one of the plurality of the templates as corresponding to the document; and
providing the identified at least one of the plurality of the templates for display as a recommended template.

Item 2. The data processing system of item 1, wherein the document is a partially completed document.

Item 3. The data processing system of items 1 or 2, wherein the document has a templatic pattern.

Item 4. The data processing system of any preceding item, wherein the template representations are encoded using a trained template representation model.

Item 5. The data processing system of any preceding item, wherein the template representations are encoded in an offline stage.

Item 6. The data processing system of any preceding item, wherein the executable instructions, when executed by the processor, cause the data processing system to perform functions of:
classifying, using a document classifier, the document as having a document type, the document type being among a plurality of document types, each document type corresponding to one of the plurality of templates;
upon identifying the at least one of the plurality of the templates, determining whether the classified document type matches the document type of the identified at least one of the plurality of the templates; and
providing the identified at least one of the plurality of the templates for display as a recommended template, upon determining that the classified document type matches the document type of the identified at least one of the plurality of the templates.

Item 7. The data processing system of item 6, wherein the document classifier further classifies the document as having a document subtype.

Item 8. The data processing system of any preceding item, wherein executable instructions, when executed by the processor, cause the data processing system to perform functions of:
- comparing, the one or more embedding representations to a plurality of sample document representations, each of the plurality of sample document representations being a representation of content and structure of one of the plurality of sample documents;
- identifying, based on the comparison, at least one of the plurality of sample documents as corresponding to the document; and
- providing the identified at least one of the plurality of sample documents for display as a recommended sample document.

Item 9. The data processing system of any preceding item, wherein the at least one of the plurality of sample documents is identified by comparing the document and the plurality of sample documents at a section level.

Item 10. A method for identifying a template for a document comprising:
- receiving a request to identify the template from among a plurality of available templates, the plurality of templates being templates that are available for use in an application;
- encoding the content and structure of the document into one or more embedding representations via a trained document encoder;
- comparing, the one or more embedding representations to a plurality of template representations, each of the plurality of template representations being a representation of content and structure of one of the plurality of templates;
- identifying, based on the comparison, at least one of the plurality of the templates as corresponding to the document; and
- providing the identified at least one of the plurality of the templates for display as a recommended template.

Item 11. The method of item 10, wherein the document is a partially completed document.

Item 12. The method of items 10 or 11, wherein the template representations are encoded using a trained template representation model.

Item 13. The method of any of items 10-12, further comprising:
- determining that the identified at least one of the plurality of the templates has a confidence score that does not meet a required threshold level;
- determining that, within a predetermined time period, a given number of users have created documents having a document type that is similar to the document type of the document; and
- creating a notification to inform a content curator of a need for creating a new template for the document type.

Item 14. The method of any of items 10-13, further comprising:
- classifying, using a document classifier, the document as having a document type, the document type being among a plurality of document types, each document type corresponding to one of the plurality of templates;
- upon identifying the at least one of the plurality of the templates, determining whether the classified document type matches the document type of the identified at least one of the plurality of the templates; and
- providing the identified at least one of the plurality of the templates for display as a recommended template, upon determining that the classified document type matches the document type of the identified at least one of the plurality of the templates.

Item 15. The method of any of items 10-14, further comprising:
- comparing, the one or more embedding representations to a plurality of sample document representations, each of the plurality of sample document representations being a representation of content and structure of one of the plurality of sample documents;
- identifying, based on the comparison, at least one of the plurality of sample documents as corresponding to the document; and
- providing the identified at least one of the plurality of sample documents for display as a recommended sample document.

Item 16. The method of any of items 10-15, wherein the recommended template is displayed in a selectable user interface element.

Item 17. A non-transitory computer readable medium on which are stored instructions that, when executed, cause a programmable device to perform functions of:
- receiving a request to identify a template from among a plurality of available templates for a document, the plurality of templates being templates that are available for use in an application;
- encoding the content and structure of the document into one or more embedding representations via a trained document encoder;
- comparing, the one or more embedding representations to a plurality of template representations, each of the plurality of template representations being a representation of content and structure of one of the plurality of templates;
- identifying, based on the comparison, at least one of the plurality of the templates as corresponding to the document; and
- providing the identified at least one of the plurality of the templates for display as a recommended template.

Item 18. The non-transitory computer readable medium of item 17, wherein the instructions, when executed further cause the programmable device to perform functions of:
- classifying, using a document classifier, the document as having a document type, the document type being among a plurality of document types, each document type corresponding to one of the plurality of templates;
- upon identifying the at least one of the plurality of the templates, determining whether the classified document type matches the document type of the identified at least one of the plurality of the templates; and
- providing the identified at least one of the plurality of the templates for display as a recommended template, upon determining that the classified document type matches the document type of the identified at least one of the plurality of the templates.

Item 19. The non-transitory computer readable medium of item 18, wherein the document classifier further classifies the document as having a document subtype.

Item 20. The non-transitory computer readable medium of any of items 17-19, wherein the instructions, when executed further cause the programmable device to perform functions of:
- comparing, the one or more embedding representations to a plurality of sample document representations, each of the plurality of sample document representations being a representation of content and structure of one of the plurality of sample documents;

identifying, based on the comparison, at least one of the plurality of sample documents as corresponding to the document; and providing the identified at least one of the plurality of sample documents for display as a recommended sample document.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving a request to identify a template from among a plurality of available templates for a document, the plurality of templates being templates that are available for use in an application;
   encoding a content and structure of the document into one or more embedding representations via a trained document encoder;
   comparing, the one or more embedding representations to a plurality of template representations, each of the plurality of template representations being a representation of content and structure of one of the plurality of templates;
   identifying, based on the comparison, at least one of the plurality of the templates as corresponding to the document; and
   providing the identified at least one of the plurality of the templates for display as a recommended template.

2. The data processing system of claim 1, wherein the document is a partially completed document.

3. The data processing system of claim 1, wherein the document has a templatic pattern.

4. The data processing system of claim 1, wherein the template representations are encoded using a trained template representation model.

5. The data processing system of claim 1, wherein the template representations are encoded in an offline stage.

6. The data processing system of claim 1, wherein the executable instructions, when executed by the processor, cause the data processing system to perform functions of:
   classifying, using a document classifier, the document as having a document type, the document type being among a plurality of document types, each document type corresponding to one of the plurality of templates;
   upon identifying the at least one of the plurality of the templates, determining whether the classified document type matches the document type of the identified at least one of the plurality of the templates; and
   providing the identified at least one of the plurality of the templates for display as a recommended template, upon determining that the classified document type matches the document type of the identified at least one of the plurality of the templates.

7. The data processing system of claim 6, wherein the document classifier further classifies the document as having a document subtype.

8. The data processing system of claim 1, wherein executable instructions, when executed by the processor, cause the data processing system to perform functions of:
   comparing, the one or more embedding representations to a plurality of sample document representations, each of the plurality of sample document representations being a representation of content and structure of one of a plurality of sample documents;

identifying, based on the comparison, at least one of the plurality of sample documents as corresponding to the document; and providing the identified at least one of the plurality of sample documents for display as a recommended sample document.

9. The data processing system of claim 1, wherein the at least one of the plurality of sample documents is identified by comparing the document and the plurality of sample documents at a section level.

10. A method for identifying a template for a document comprising:

receiving a request to identify the template from among a plurality of available templates, the plurality of templates being templates that are available for use in an application;

encoding a content and structure of the document into one or more embedding representations via a trained document encoder;

comparing, the one or more embedding representations to a plurality of template representations, each of the plurality of template representations being a representation of content and structure of one of the plurality of templates;

identifying, based on the comparison, at least one of the plurality of the templates as corresponding to the document; and providing the identified at least one of the plurality of the templates for display as a recommended template.

11. The method of claim 10, wherein the document is a partially completed document.

12. The method of claim 10, wherein the template representations are encoded using a trained template representation model.

13. The method of claim 10, further comprising:

determining that the identified at least one of the plurality of the templates has a confidence score that does not meet a required threshold level;

determining that, within a predetermined time period, a given number of users have created documents having a document type that is similar to the document type of the document; and creating a notification to inform a content curator of a need for creating a new template for the document type.

14. The method of claim 10, further comprising:

classifying, using a document classifier, the document as having a document type, the document type being among a plurality of document types, each document type corresponding to one of the plurality of templates;

upon identifying the at least one of the plurality of the templates, determining whether the classified document type matches the document type of the identified at least one of the plurality of the templates; and providing the identified at least one of the plurality of the templates for display as a recommended template, upon determining that the classified document type matches the document type of the identified at least one of the plurality of the templates.

15. The method of claim 10, further comprising:

comparing, the one or more embedding representations to a plurality of sample document representations, each of the plurality of sample document representations being a representation of content and structure of one of a plurality of sample documents;

identifying, based on the comparison, at least one of the plurality of sample documents as corresponding to the document; and providing the identified at least one of the plurality of sample documents for display as a recommended sample document.

16. The method of claim 10, wherein the recommended template is displayed in a selectable user interface element.

17. A non-transitory computer readable medium on which are stored instructions that, when executed, cause a programmable device to perform functions of:

receiving a request to identify a template from among a plurality of available templates for a document, the plurality of templates being templates that are available for use in an application;

encoding a content and structure of the document into one or more embedding representations via a trained document encoder;

comparing, the one or more embedding representations to a plurality of template representations, each of the plurality of template representations being a representation of content and structure of one of the plurality of templates;

identifying, based on the comparison, at least one of the plurality of the templates as corresponding to the document; and providing the identified at least one of the plurality of the templates for display as a recommended template.

18. The non-transitory computer readable medium of claim 17, wherein the instructions, when executed further cause the programmable device to perform functions of:

classifying, using a document classifier, the document as having a document type, the document type being among a plurality of document types, each document type corresponding to one of the plurality of templates;

upon identifying the at least one of the plurality of the templates, determining whether the classified document type matches the document type of the identified at least one of the plurality of the templates; and providing the identified at least one of the plurality of the templates for display as a recommended template, upon determining that the classified document type matches the document type of the identified at least one of the plurality of the templates.

19. The non-transitory computer readable medium of claim 18, wherein the document classifier further classifies the document as having a document subtype.

20. The non-transitory computer readable medium of claim 17, wherein the instructions, when executed further cause the programmable device to perform functions of:

comparing, the one or more embedding representations to a plurality of sample document representations, each of the plurality of sample document representations being a representation of content and structure of one of a plurality of sample documents;

identifying, based on the comparison, at least one of the plurality of sample documents as corresponding to the document; and providing the identified at least one of the plurality of sample documents for display as a recommended sample document.

\* \* \* \* \*